(12) United States Patent
Carroll (10) Patent No.: US 10,184,504 B1
(45) Date of Patent: Jan. 22, 2019

(54) CANOPY SUPPORT ARM ASSEMBLY

(71) Applicant: Datum Holdings, LLC, West Palm Beach, FL (US)

(72) Inventor: Matthew R. Carroll, Jupiter, FL (US)

(73) Assignee: Datum Holdings, LLC, West Palm Beach, FL (US)

( * ) Notice: Subject to any disclaimer, the term of this patent is extended or adjusted under 35 U.S.C. 154(b) by 0 days.

(21) Appl. No.: 15/982,571

(22) Filed: May 17, 2018

(51) Int. Cl.
| | | |
|---|---|---|
| A47F 5/00 | (2006.01) | |
| F16B 9/02 | (2006.01) | |
| F16B 7/18 | (2006.01) | |
| E04F 10/00 | (2006.01) | |
| E04F 10/06 | (2006.01) | |

(52) U.S. Cl.
CPC .............. *F16B 9/026* (2013.01); *F16B 7/182* (2013.01); *E04F 10/005* (2013.01); *E04F 10/0633* (2013.01)

(58) Field of Classification Search
CPC ... E04F 10/0633; E04F 10/0662; F16B 9/026; F16B 7/182
See application file for complete search history.

(56) References Cited

U.S. PATENT DOCUMENTS

| | | | | |
|---|---|---|---|---|
| 7,097,154 | B2* | 8/2006 | Stevens | B25B 25/00 174/40 TD |
| 7,451,962 | B1* | 11/2008 | Kennedy | F16B 7/06 254/231 |
| 2013/0174931 | A1* | 7/2013 | Hendershot | F16L 3/1075 138/107 |
| 2018/0229809 | A1* | 8/2018 | Stefanoff | B63B 25/004 |

* cited by examiner

*Primary Examiner* — Amy J. Sterling
(74) *Attorney, Agent, or Firm* — McHale & Slavin, P.A.

(57) ABSTRACT

Disclosed is a canopy support arm assembly formed from a support tube having a continuous sidewall that can be cut to size at a job site. The support tube is coupled on each end by base elements having a receiver end sized for receipt of the end of the support tube and a conical shaped barrel having threads formed along an outer surface. An aperture passes through each threaded end for receipt of a threaded rod that is constructed and arranged to extend through the threaded ends and aperture using nut fasteners to provide a compression force between the elements. A first connector having a threaded receptacle engages the threaded end of the first base element, concealing one of the nut fasteners. A second connector having a threaded receptacle engages the threaded end of the second base element, concealing the other nut fastener.

11 Claims, 8 Drawing Sheets

CANOPY SUPPORT ARM ASSEMBLY

FIELD OF THE INVENTION

The field of the invention is building canopies and, in particular, an improved canopy assembly.

BACKGROUND OF THE INVENTION

The use of canopies on commercial buildings has increased, in part, due to a recognized understanding that canopies increase the functionality of a building's entryway. The use of a canopy extends the entryway to the outside of a building, and operates to protect individuals entering or exiting the building. Canopies effectively shield the individuals from rain, snow and direct sunlight. Further, the covered area can be expected to be free of ice, making the use of a canopy not just an option but, in some instances, a safety requirement.

Covering an entryway eliminates the need for consuming space within the envelope of the building for certain items. For instance, a canopy allows a person to stand outside and wait for a ride versus consuming indoor space. Similarly, rugs for use in cleaning the bottom of shoes may be placed outside, eliminating or reducing the need for further indoor floor protection.

Canopies can be used to enhance the façade of the building to provide aesthetically appealing covers that can be a focal point of the building. However, one of the problems with known cantilevered assemblies is their inability to be modified on site, and the risk of becoming unsightly should on-site modification be required. Further, any modification can destroy a painted or anodized assembly.

What is needed in the industry is an improved support arm assembly that can be easily assembled at the factory but can also be modified on-site without welding, while continuing to be able to provide its two main functions of structural support and leveling adjustment capability.

SUMMARY OF THE INVENTION

Disclosed is a canopy support arm assembly having a support tube that provides compression load capability and a threaded rod that provides tension load capability to the support arm assembly. The assembly employs a support tube and a threaded rod that can be cut to size at a job site. The support tube trapped between two base elements that each have a receiver end sized for receipt of the end of the support tube. The base elements also have a conical shaped barrel having threads formed along an outer surface with an aperture extending from the receiver end through the threaded end. One of the base elements threaded ends is a right hand thread and the other is a left hand thread allowing the assembly to be used as a type of turn buckle assembly one fully assembled.

A threaded rod having a length is constructed and arranged to extend through the aperture in the first threaded end, through the support tube and out through the aperture in the second threaded end with nut fasteners placed on each end of the threaded rod. The nut fasteners are tightened to hold the assembly together.

A first connector having a threaded receptacle engages the threaded end of the first base element, concealing one of the nut fasteners. A second connector having a threaded receptacle engages the threaded end of the second base element, concealing the other nut fastener. The support tube assembly can be rotated to allow said base element threads to extend or compress a length of the assembly. Each connector has an aperture for ease of coupling to fixed elements.

An objective of the invention is to disclose an improved canopy support arm assembly that can be easily modified to fit at a remote location while maintaining a pristine appearance.

Still another objective of the invention is to teach the use of a support arm having a tube for compression loads and a threaded rod for tension loads.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE PREFERRED EMBODIMENT

Figure 1:
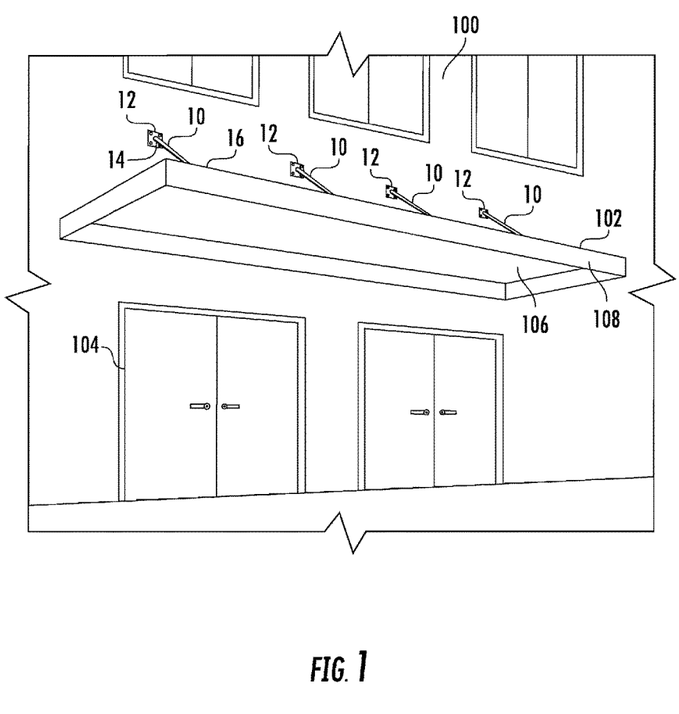
FIG. 1 is a pictorial view of the canopy support arm assembly holding a canopy.

A detailed embodiment of the instant invention is disclosed herein; however, it is to be understood that the disclosed embodiment is merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure. Referring now to FIG. 1, depicted is a canopy support arm assembly 10 having mounting plates 12 for attaching a first end 14 of the support arms to the building façade 100 and a second end 16 for securing to a canopy 102. The canopy 102 is placed a distance above a door or the like entryway 104 to shield individuals entering or leaving the building from the sun and rain. The canopy is formed by decking 106 with a framing 108.

Referring now to the Figures in general, the canopy support arm assembly 10 is further defined by a support tube 20 having a continuous sidewall with an outer surface 22 of a predetermined diameter and an inner surface 23 forming a hollow space between a first end 24 and a second end 26. Unique to this invention is the ability to size the assembly arm at a job site, wherein the support tube 20 and threaded rod 70 can be cut to size and assembled without welding. The support tube 20 is preferably constructed from aluminum, but any material can be used. The aluminum can be painted or anodized. As will be evident in the assembly, any edge that is cut at a job site will be concealed, wherein damage to a coating will not affect the aesthetical view of the assembly.

Figure 4:
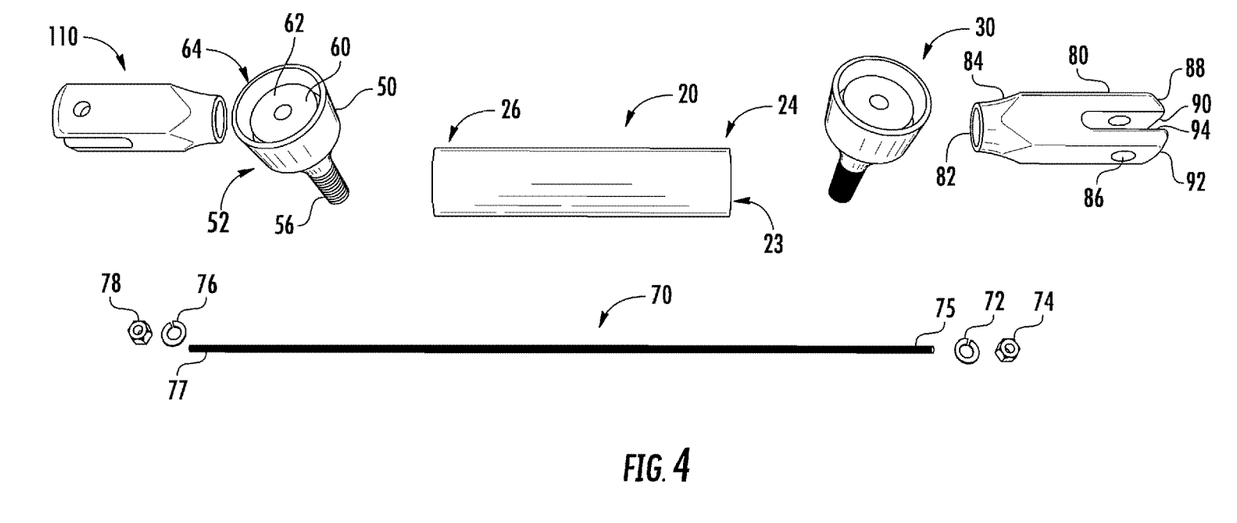
FIG. 4 is an exploded view of the canopy support arm.
Figure 5:
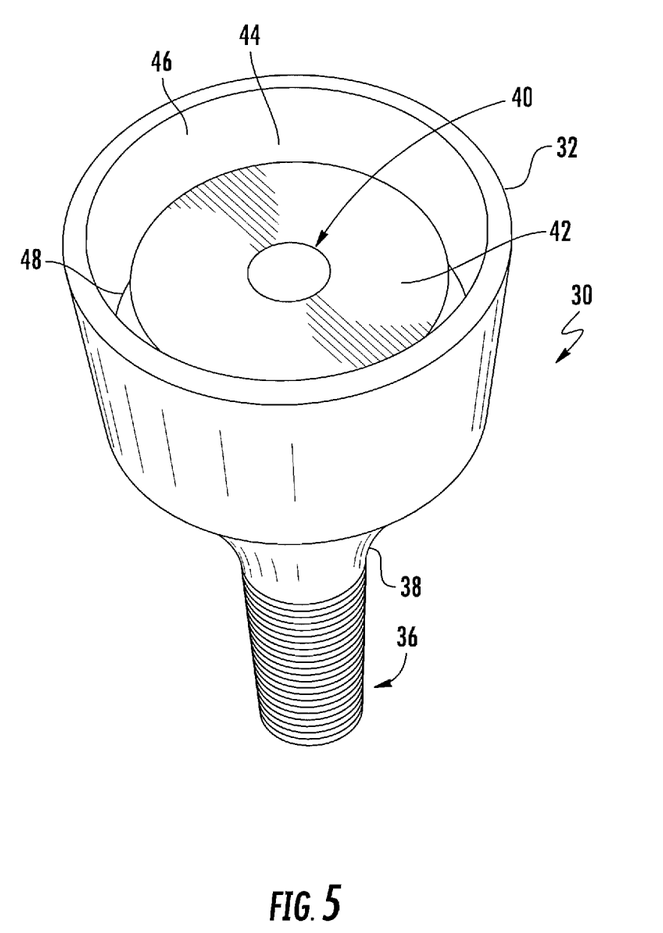
FIG. 5 is a perspective view of a base element.

A first base element 30 has a receiver end 32 sized for receipt of the first end 24 of the support tube 20 and a conical shaped barrel 34 having a first threaded end 36 formed along an outer surface 38. The first base element 30 has an aperture 40 extending from the receiver end 32 through the first threaded end 36. The base element 30 includes an alignment collar 42 centrally positioned within the base element 30 having aperture 40 sized for receipt of a threaded rod 70 and a rim section 44 constructed and arranged to receive a portion of the support tube sidewall 22, securing the sidewall between an inner surface 46 of the first base element 30 and an outer surface 48 of the alignment collar 42.

A second base element 50 has a receiver end 52 sized for receipt of the second end 26 of the support tube 20 and a conical shaped barrel 54 having a second threaded end 56 formed along an outer surface 58. The threaded ends 36, 56 for the first and second base elements 30, 50 each have a diameter less than the diameter of the support tube 20. The second base element 50 and the first base element 30 have opposing threads. Similar to the first base element 30, the second base element 50 has an aperture 60 extending from the receiver end 52 through the second threaded end 56. The second base element 50 includes an alignment collar 62 centrally positioned within the base element 50 with the aperture 60 sized for receipt of the threaded rod 70. The alignment collar 62 is formed from a rim section 64 constructed and arranged to receive a portion of the support tube sidewall 22, securing the sidewall between an inner surface 46 of the second base element 50 and an outer surface 48 of the alignment collar 62 in the same manner as the first base element 30.

Figure 3:
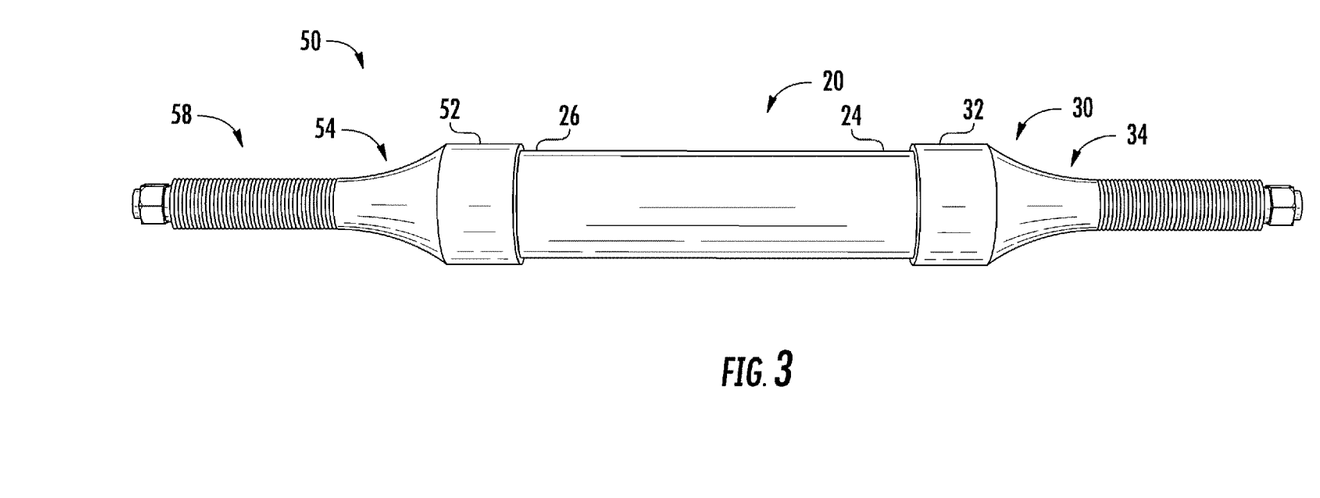
FIG. 3 is a plane view of the canopy support arm without connectors.

When the approximate length of an assembly is calculated, the support tube 20 is cut. The first base element 30 is then placed on the first end 24 of the support tube 20. Similarly, the second base element 50 is placed on the second end 26 of the support tube. A threaded rod 70 is inserted through the first base element 30 and the support tube 20, and a portion of the threaded rod 70 extends out of the second base element as depicted in FIG. 3. A lock washer 72 and nut fastener 74 are placed along a first end 75 of the threaded rod, and another lock washer 76 and nut fastener 78 are secured to the second end 77 of the threaded rod. The nut fasteners 74, 78 can then be tightened, holding the support arm assembly 10 together. It is noted that the ends of the support tube 24, 26 are concealed in the elements, assuring that any damage to the tube 20 during cutting is concealed where it cannot affect aesthetics of the assembly. The threaded rod 70 is preferably stainless steel, and any excess is cut off so that the ends 75, 77 of the threaded rod 70 do not extend further than an outer edge of each nut fastener 74, 78.

A first connector 80 has a threaded receptacle 82 for engagement of the first base element 30 threaded end 36 formed along a proximal end 84, and at least one traversely positioned aperture 86 located along a distal end 88. In the preferred embodiment, the distal end 88 includes a fork shape formed by a first wall 90 spaced apart from a second wall 92, forming a U-shaped receptacle 94 therebetween. In this embodiment, the receptacle 94 can receive a tab connector, as explained later in this specification.

Figure 2:
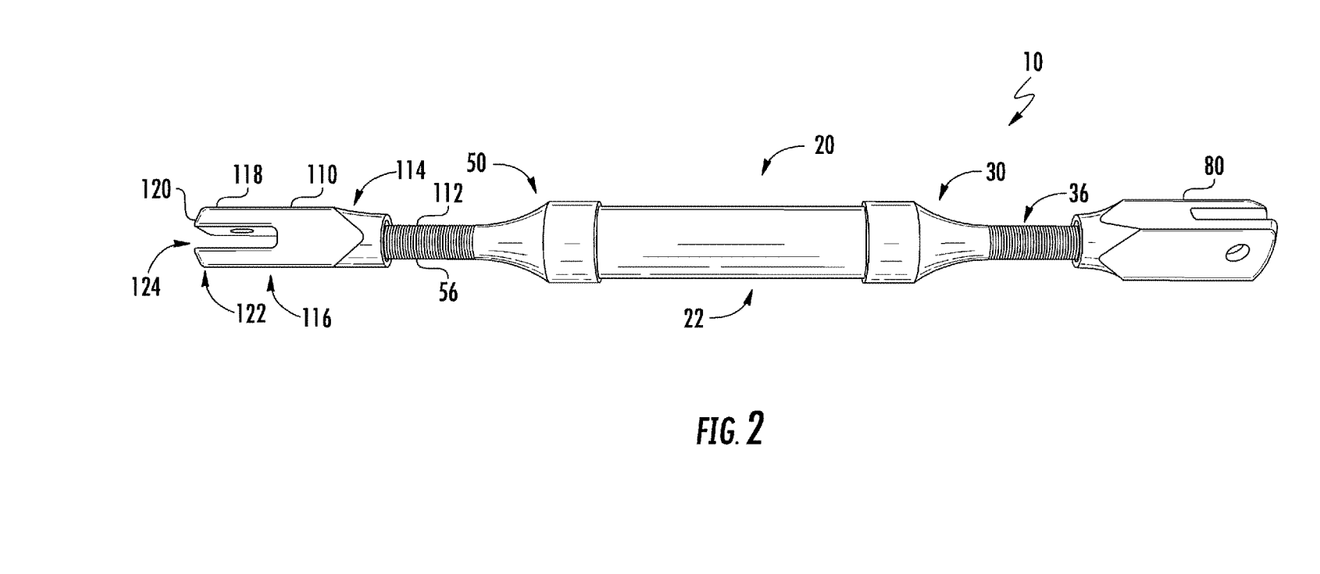
FIG. 2 is a plane view of the canopy support arm.

A second connector 110 is a duplicate of the first connector 80 with the exception of the internal threads are opposite. As with the first connector 80, the second connector 110 has a threaded receptacle 112 for engagement of the second base element 50 threaded end 56 formed along a proximal end 114, and at least one traversely positioned aperture 116 located along a distal end 118. In the preferred embodiment, the distal end 118 includes a fork shape formed by a first wall 120 spaced apart from a second wall 122 forming a U-shaped receptacle 124 therebetween. The receptacle 124 is constructed to receive a tab 125 formed as a part of a mounting plate 12. When the first and second base elements 30, 50 are coupled to the support tube by the threaded rod 70 extending therethrough with nut fasteners 74, 78 attached to the ends 75, 77 of the threaded rod 70, the nut fasteners 74, 78 are concealed from view by the first and second connectors 80, 110, which are attached to the base elements 30, 50. The first connector 80 and the second connector 110 employ opposite facing threads.

Figure 6:
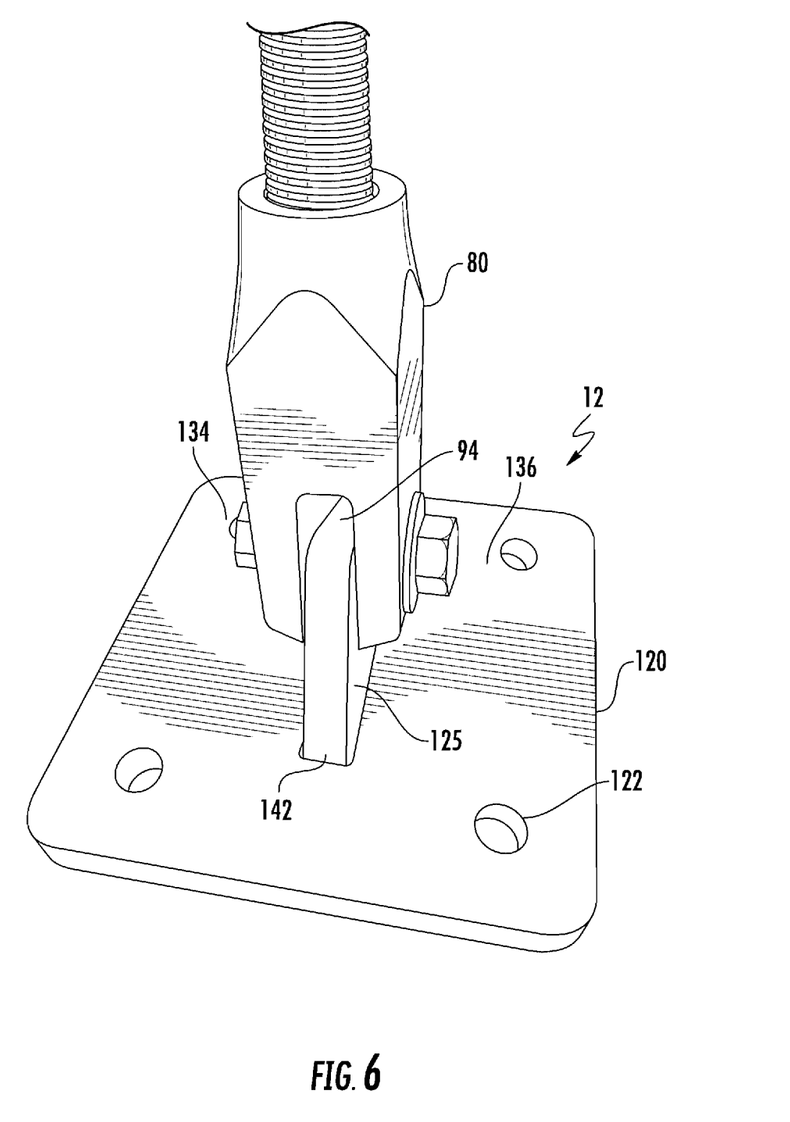
FIG. 6 is an enlarged view of the mounting plate assembly.
Figure 7:
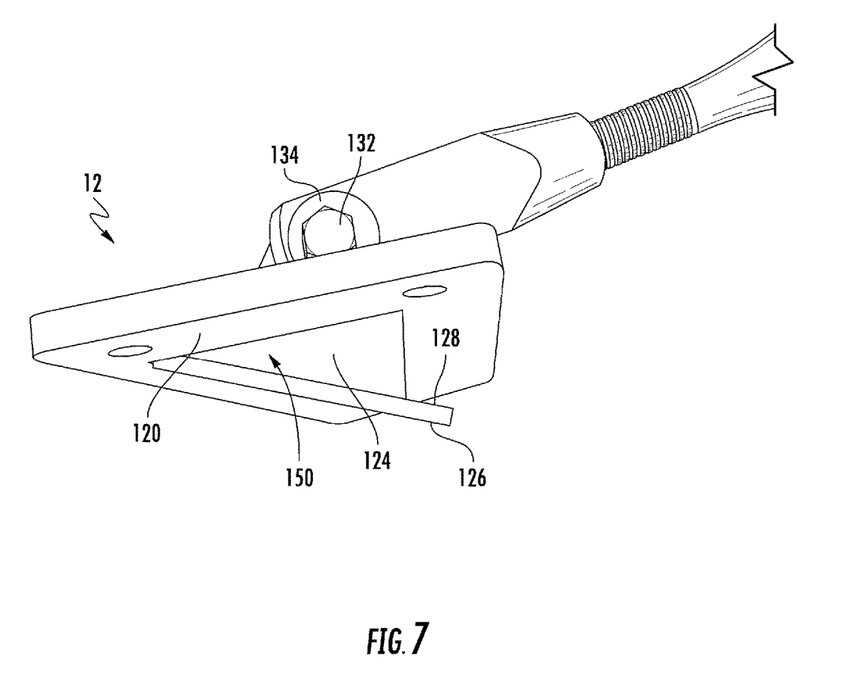
FIG. 7 is a side view of the mounting plate with the tab plate partially installed.
Figure 8:
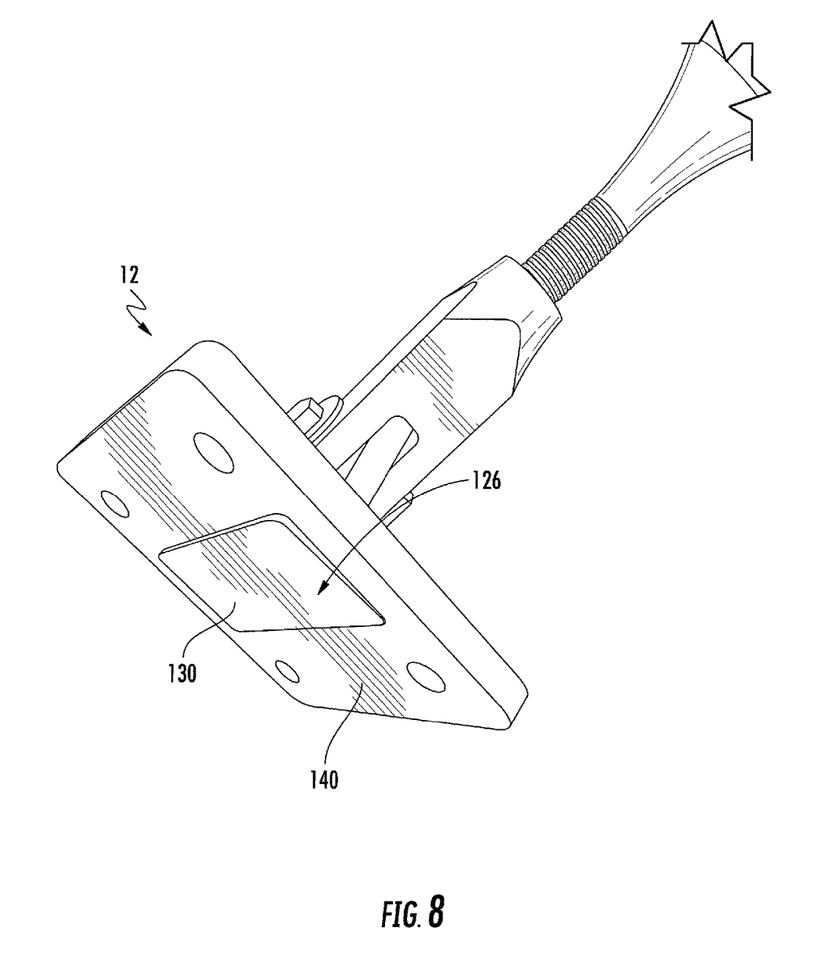
FIG. 8 is a rear perspective view of the tab plate installed flush with the rear of the mounting plate.

Referring now to FIGS. 6-8, a mounting plate 12 is used for attachment to either the first connector 80 or the second connector 110. The mounting plate 12 is formed from a plate 120 having fastener holes 122 for securing to a fixed object, and a tab 124 extending outwardly from a base 126 having a first side 128 and a second side 130. The tab 124 includes an aperture 132 for receipt of a bolt 134 fastened to a nut 136 to align with aperture 86 of connector 80.

The tab 124 extends from a back side 140 of the plate 120 and protrudes through a slot 142. The tab 124 is permanently attached to the base 126, which is sandwiched between the back side 140 of the mounting plate 120 and the fixed object that the mounting plate 120 is secured to. The base 126 is substantially rectangular and positionable within a countersunk cavity 150 formed on the back side 140 of the plate 120; the base 126 having a second side 130 that is flush with the back side 140 of the plate 120, forming a flush mounting surface.

All patents and publications are herein incorporated by reference to the same extent as if each individual publication was specifically and individually indicated to be incorporated by reference. It is to be understood that while a certain form of the invention is illustrated, it is not to be limited to the specific form or arrangement herein described and shown. It will be apparent to those skilled in the art that various changes may be made without departing from the scope of the invention, and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention, which are obvious to those skilled in the art, are intended to be within the scope of the following claims.

The term "coupled" is defined as connected, although not necessarily directly, and not necessarily mechanically. The use of the word "a" or "an" when used in conjunction with the term "comprising" in the claims and/or the specification may mean "one," but it is also consistent with the meaning of "one or more" or "at least one." The use of the term "or"

in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

What is claimed is:

1. A canopy support arm assembly comprising:
    a support tube having a continuous sidewall with an outer surface of a predetermined diameter and an inner surface forming a hollow space between a first end and a second end;
    a first base element having a receiver end sized for receipt of said first end of said support tube and a conical shaped barrel having threads formed along an outer surface, said first base element having an aperture extending from said receiver end through said first threaded end;
    a second base element having a receiver end sized for receipt of said second end of said support tube and a conical shaped barrel having threads formed along an outer surface, said second base element having an aperture extending from said receiver end through said second threaded end;
    a threaded rod having a length constructed and arranged to extend from said first threaded end through said second threaded end, said threaded rod having a first nut fastener threadably secured to a first end and a second nut fastener threadably secured to a second end;
    a first connector having a threaded receptacle for engagement of said first base element threaded end and at least one aperture for receipt of a fastener; and
    a second connector having a threaded receptacle for engagement of said second base element threaded end and at least one aperture for receipt of a fastener.

2. The canopy support arm assembly according to claim 1 wherein said threaded end of said first and second connectors each have a diameter less than the diameter of said support tube.

3. The canopy support arm assembly according to claim 1 wherein said first and second base elements have opposite threads.

4. The canopy support arm assembly according to claim 1 wherein said support tube is cut to a required length and placed between said first and second base elements, and said first and second connectors are coupled to said support tube by said threaded rod.

5. The canopy support arm assembly according to claim 4 wherein said threaded rod is cut to a required length and placed between said first and second base elements, said first and second base elements are coupled to said support tube by said threaded rod extending therethrough with nut fasteners attached to said ends of said threaded rod, wherein said nut fasteners are concealed from view when said first and second connectors are threadingly coupled to said first and second base elements.

6. The canopy support arm assembly according to claim 1 wherein each said connector includes a fork end formed by a first wall spaced apart from a second wall, said first and second walls having an aperture for receipt of a fastener.

7. The canopy support arm assembly according to claim 1 wherein each said base element includes an alignment collar positioned within said base element, said alignment collar having a centrally disposed aperture for receipt of said threaded rod, and a rim to position an end of said support tube sidewall between an inner surface of said element and an outer surface of said collar.

8. The canopy support arm assembly according to claim 1 wherein said first and second connectors are interchangeable.

9. The canopy support arm assembly according to claim 1 including a mounting plate for attachment to either said first or second connector, said mounting plate formed from a plate having fastener holes for securing to a fixed object and a tab extending from one side having an aperture to align with an aperture of said connector, wherein a fastener bolt is placed through aligned apertures for attaching said assembly to said mounting plate.

10. The canopy support arm assembly according to claim 9 wherein said tab extends from a back side of said mounting plate and protrudes through a slot, said tab having a base that is sandwiched between the back side of said mounting plate and the fixed object that the mounting plate is secured to.

11. The canopy support arm assembly according to claim 10 wherein base is substantially rectangular and positionable within a countersunk cavity formed on the back side of said mounting plate, wherein said base having a lower surface that is flush with the back side of said mounting plate.

* * * * *